United States Patent
Hobbs et al.

(10) Patent No.: US 9,652,880 B2
(45) Date of Patent: *May 16, 2017

(54) 2D ANIMATION FROM A 3D MESH

(71) Applicant: Zynga Inc., San Francisco, CA (US)

(72) Inventors: Bret Steven Hobbs, San Francisco, CA (US); Sean Uberoi Kelly, Washington, DC (US)

(73) Assignee: Zynga Inc., San Francisco, CA (US)

( * ) Notice: Subject to any disclaimer, the term of this patent is extended or adjusted under 35 U.S.C. 154(b) by 275 days.

This patent is subject to a terminal disclaimer.

(21) Appl. No.: 14/622,595

(22) Filed: Feb. 13, 2015

(65) Prior Publication Data
US 2015/0161763 A1    Jun. 11, 2015

Related U.S. Application Data

(63) Continuation of application No. 13/399,520, filed on Feb. 17, 2012, now Pat. No. 8,988,446.
(Continued)

(51) Int. Cl.
*G06T 3/00* (2006.01)
*G06T 13/80* (2011.01)
(Continued)

(52) U.S. Cl.
CPC ............ *G06T 13/80* (2013.01); *G06T 3/0037* (2013.01); *G06T 15/04* (2013.01); *G06T 17/20* (2013.01); *G06T 19/00* (2013.01)

(58) Field of Classification Search
CPC ....... G06T 3/0037; G06T 13/80; G06T 15/04; G06T 17/20; G06T 19/00
(Continued)

(56) References Cited

U.S. PATENT DOCUMENTS 5,107,444 A    4/1992 Wu
5,369,736 A    11/1994 Kato et al.
(Continued)

FOREIGN PATENT DOCUMENTS

WO    WO-2013052208 A2    4/2013

OTHER PUBLICATIONS

"2D Drawing in OpenGL", Tangent, LLC, 2011 [retrieved on Sep. 21, 2011]. Retrieved from the Internet: <URL: http://basic4gl.wikispaces.com/2D+Drawing+in+OpenGL>, 5 pgs.
(Continued)

*Primary Examiner* — Jacinta M Crawford
*Assistant Examiner* — Terrell Robinson
(74) *Attorney, Agent, or Firm* — Schwegman Lundberg & Woessner, P.A.

(57) ABSTRACT

Two-dimensional (2D) animation may be generated from a three-dimensional (3D) mesh by a machine or device that flattens, textures, and modifies the 3D mesh, which results in distorting the texture of the 3D mesh. The machine or device is configured to access and flatten a 3D mesh of 3D vertices. At least some of the 3D vertices of the flattened 3D mesh are texture mapped with a 2D image. The machine or device generates a first 2D frame of animation by rendering the 3D mesh (e.g., with graphics acceleration hardware), modifies the 3D mesh by repositioning one or more of the 3D vertices, and generates a second 2D frame of animation by rendering the modified 3D mesh (e.g., with graphics acceleration hardware). Accordingly, 2D animation may be generated by distorting the 2D image that is mapped onto at least part of the 3D mesh.

20 Claims, 11 Drawing Sheets

3D mesh (flattened, textured, and modified by repositioning 3D vertex in x-y plane)

Related U.S. Application Data

(60) Provisional application No. 61/544,420, filed on Oct. 7, 2011.

(51) Int. Cl.
*G06T 15/04* (2011.01)
*G06T 17/20* (2006.01)
*G06T 19/00* (2011.01)

(58) Field of Classification Search
USPC .......................................................... 345/582
See application file for complete search history.

(56) References Cited

U.S. PATENT DOCUMENTS

| | | | |
|---|---|---|---|
| 6,606,096 | B2 | 8/2003 | Wang |
| 2001/0056308 | A1* | 12/2001 | Petrov ............... G06T 17/20 700/98 |
| 2002/0080139 | A1 | 6/2002 | Koo et al. |
| 2002/0154132 | A1* | 10/2002 | Dumesny ............ G06T 15/04 345/582 |
| 2005/0213820 | A1 | 9/2005 | Liu et al. |
| 2006/0188144 | A1* | 8/2006 | Sasaki ............. G06K 9/00281 382/154 |
| 2007/0206016 | A1* | 9/2007 | Szymanski ......... G06T 13/20 345/473 |
| 2008/0204447 | A1* | 8/2008 | Amsterdam ......... G06T 13/20 345/419 |
| 2009/0284550 | A1 | 11/2009 | Shimada et al. |
| 2011/0074770 | A1* | 3/2011 | Robinson ............ G06T 15/20 345/419 |
| 2013/0088491 | A1 | 4/2013 | Hobbs et al. |

OTHER PUBLICATIONS

"2D using OpenGL", May 28, 2005 [retrieved on Sep. 21, 2011]. Retrieved from the Internet: <URL: http://wiki.allegro.cc/index.php?title=2D_using_OpenGL>, 7 pgs.

"Android OpenGL ES and 2D", Aug. 24, 2010 [retrieved on Sep. 21, 2011]. Retrieved from the Internet: <URL: http://stackoverflow.com/questions/3553244/android-opengl-es-and-2d>, 3 pgs.

"U.S. Appl. No. 13/399,520, Examiner Interview Summary mailed Dec. 10, 2013", 3 pgs.

"U.S. Appl. No. 13/399,520, Non Final Office Action mailed Jun. 6, 2014", 30 pgs.

"U.S. Appl. No. 13/399,520, Non Final Office Action mailed Oct. 31, 2013", 29 pgs.

"U.S. Appl. No. 13/399,520, Notice of Allowance mailed Nov. 26, 2014", 11 pgs.

"U.S. Appl. No. 13/399,520, Response filed Jan. 23, 2014 to Non-Final Office Action dated Oct. 31, 2013", 18 pgs.

"U.S. Appl. No. 13/399,520, Response filed Aug. 20, 2014 to Non-Final Office Action dated Jun. 6, 2014", 15 pgs.

"Approaches for 2D tile rendering", Nov. 23, 2010 [retrieved on Sep. 21, 2011]. Retrieved from the Internet: <URL: http://www.opengl.org/discussion_boards/ubbthreads.php?ubb-showfla . . . >, 4 pgs.

"Doc:Manual/Modifiers/Mesh/Displace", May 29, 2010 [retrieved on Sep. 21, 2011]. Retrieved from the Internet: <URL: http://wiki.blender.org/index.php/Doc:Manual/Modifiers/Mesh/Displace>, 5 pgs.

"International Application Serial No. PCT/2012/051858, International Preliminary Report on Patentability mailed Apr. 17, 2014", 8 pgs.

"International Application Serial No. PCT/2012/051858, Search Report mailed Nov. 2, 2012", 2 pgs.

"International Application Serial No. PCT/2012/051858, Written Opinion mailed Nov. 2, 2012", 6 pgs.

"PaRappa the Rapper", Wikipedia.org, Sep. 18, 2011 [retrieved on Sep. 30, 2011]. Retrieved from the Internet: <URL: https://secure.wikimedia.org/wikipedia/en/wiki/PaRappa_the_Rapper>, 5 pgs.

"Vanillaware", Wikipedia.org, Sep. 21, 2011 [retrieved on Sep. 30, 2011]. Retrieved from the Internet: <URL: https://secure.wikimedia.org/wikipedia/en/wiki/Vanillaware>, 2 pgs.

Grimes, B., "Shading a Bigger, Better Sequel: Techniques in Left 4 Dead 2", Valve Corporation, Mar. 2010. Retrieved from the Internet: <URL: http://www.valvesoftware.com/publications/2010/GDC10_ShaderTechniquesL4D2.pdf>, 73 pgs.

Kavan, Ladislav, et al., "Polypostors: 2D Polygonal Impostors for 3D Crowds", Proceedings of the 2008 symposium on Interactive 3D graphics and games, (2008), 149-155.

McWhertor, M., "Odin Sphere Developer Reveals Wii Project", Kotaku.com, Sep. 5, 2007 [retrieved on Sep. 30, 2011]. Retrieved from the Internet: <URL: http://kotaku.com/296831/odin-sphere-developer-reveals-wii-project?tag . . . >, 2 pgs.

Sato, Y., "Vanillaware Unveils Wii Action Game", 1UP.com, Sep. 5, 2007 [retrieved on Sep. 30, 2011]. Retrieved from the Internet: <URL: http://www.1up.com/news/vanillaware-unveils-wii-action-game>, 3 pgs.

Sheffield, B., "King of 2D: Vanillaware's George Kamitani", UBM TechWeb, Aug. 3, 2009 [retrieved on Sep. 30, 2011]. Retrieved from the Internet: <URL: http://www.gamasutra.com/view/feature/4097/king_of_2d_vanillawares_ . . . >, 20 pgs.

Snyder, John, "Visibility Sorting and Compositing Without Splitting for Image Layer Decompostions", Proceedings of the 25th Annual Conference on Computer Graphics and Interface Techniques, (1998), 219-230.

\* cited by examiner 3D mesh (flattened) with uniform z-value

Another 3D mesh (flattened) with a different z-value 3D mesh (flattened and textured with 2D image)

3D mesh (flattened, textured, and modified by repositioning 3D vertex in x-y plane)

2D ANIMATION FROM A 3D MESH

RELATED APPLICATIONS

This application is a continuation of U.S. patent application Ser. No. 13/399,520, filed on Feb. 17, 2012, which claims the priority benefit of U.S. Provisional Patent Application No. 61/544,420, filed Oct. 7, 2011, the benefit of priority of each of which is claimed hereby, and each of which are incorporated by reference herein in its entirety.

TECHNICAL FIELD

The subject matter disclosed herein generally relates to the processing of data. Specifically, the present disclosure addresses systems and methods that generate two-dimensional (2D) animation from a three-dimensional (3D) mesh.

BACKGROUND

Contemporary machines and devices may be configured to present graphics on a display (e.g., a screen). To facilitate presentation of graphics, one or more graphics accelerators may be included in a machine or device. A graphics accelerator may be implemented in hardware that is permanently or temporarily configured (e.g., by circuitry, firmware, software, or any suitable combination thereof) to render graphical data for presentation on the display. For example, graphics acceleration hardware may take the form of a dedicated graphics accelerator card, a graphics accelerator board, a graphics accelerator chip, or other graphics acceleration circuitry. As another example, graphics acceleration hardware may take the form of a multi-purpose processor that is temporarily or permanently configured to function as a graphics accelerator. Graphics acceleration hardware may support a graphics library (e.g., OpenGL) that provides an application programming interface (API) for using one or more features of the graphics acceleration hardware.

As used herein, "2D" means "two-dimensional," and "3D" means "three-dimensional." For example, a 2D vector has two dimensions (e.g., a length dimension and a width dimension), and a 3D vector has three dimensions (e.g., a length dimension, a width dimension, and a depth dimension). A graphics accelerator may support 2D graphics, 3D graphics, or both.

BRIEF DESCRIPTION OF THE DRAWINGS

Some embodiments are illustrated by way of example and not limitation in the figures of the accompanying drawings.

DETAILED DESCRIPTION

Example methods and systems are directed to generating 2D animation from a 3D mesh. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Generation of 2D animation may be less computationally intensive than generation of 3D animation. At the same time, it may be helpful to utilize a graphics accelerator (e.g., graphics acceleration hardware) present in a machine or device in generating 2D animation. In some situations, however, the graphics accelerator of a machine or device is configured (e.g., optimized) to support 3D graphics (e.g., rendering 3D objects defined by 3D meshes). Example systems and methodologies described herein may facilitate generation of 2D animation from a 3D mesh, and such generation of 2D animation may be performed using a 3D graphics accelerator.

Figure 1:
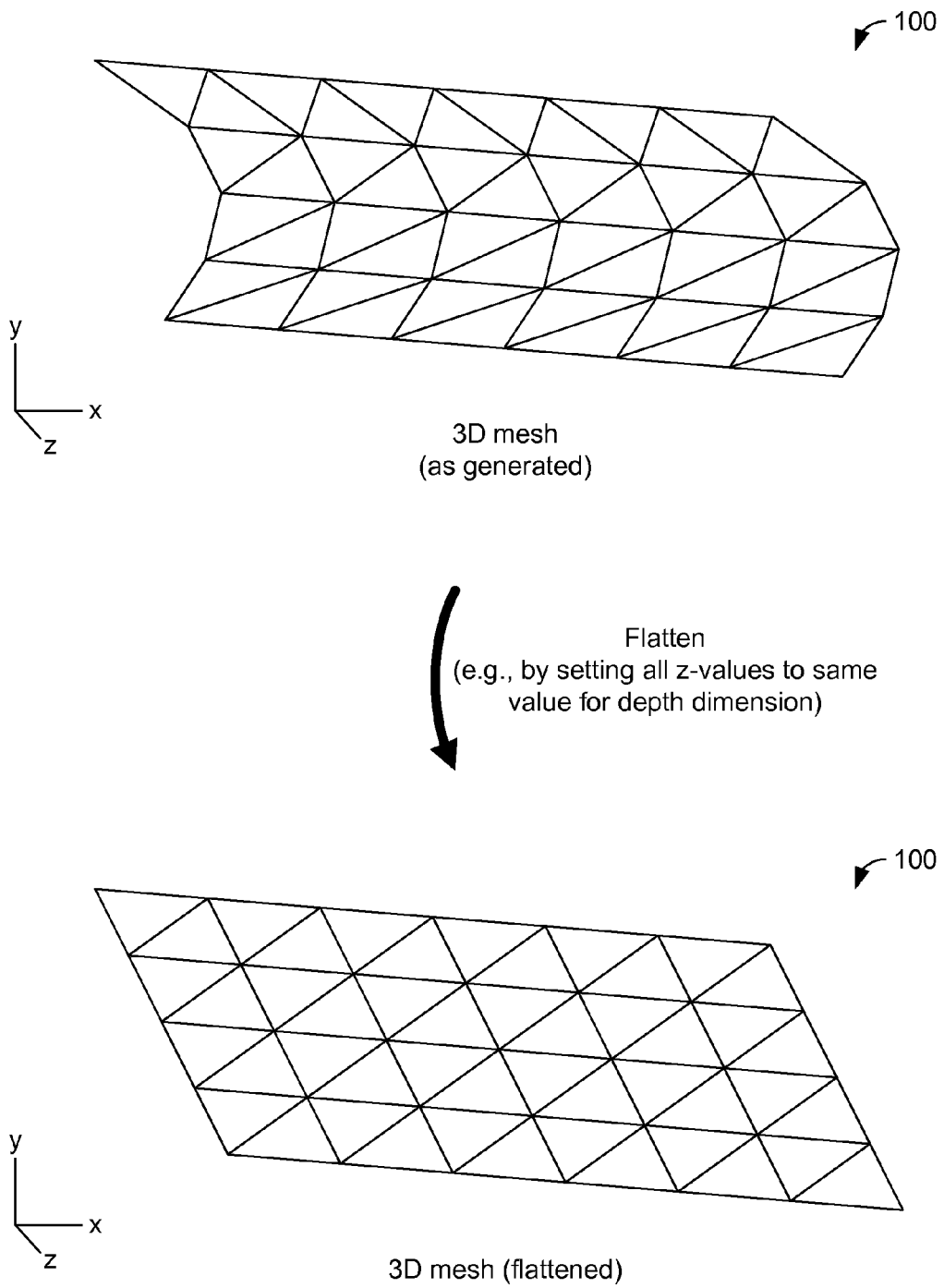
FIG. 1 is a conceptual diagram illustrating a 3D mesh being flattened to become a flattened 3D mesh having a uniform z-value, according to some example embodiments.

FIG. 1 is a conceptual diagram illustrating a 3D mesh 100 being flattened to become the flattened 3D mesh 100 having a uniform z-value, according to some example embodiments. The 3D mesh 100, as generated (e.g., by a 3D modeling application), is shown as a set of polygons (e.g., triangles) in 3D space (e.g., x-y-z space). A flattening operation may be applied to the generated 3D mesh 100, as indicated by the curved arrow. For example, the flattening operation may set all depth values (e.g., z-values) to the same value (e.g., a uniform value) for the depth dimension (e.g., the z-dimension). The 3D mesh 100, as flattened, is shown as a modified set of polygons, still in the 3D space, but having a single value (e.g., a uniform value) for the depth dimension.

According to various example embodiments, the 3D mesh 100 models a 3D object (e.g., an airplane, an animal, or a house). In some example embodiments, the 3D mesh 100 models a portion of a 3D object (e.g., a wing of an airplane, a leg of an animal, or a front door of a house).

Figure 2:
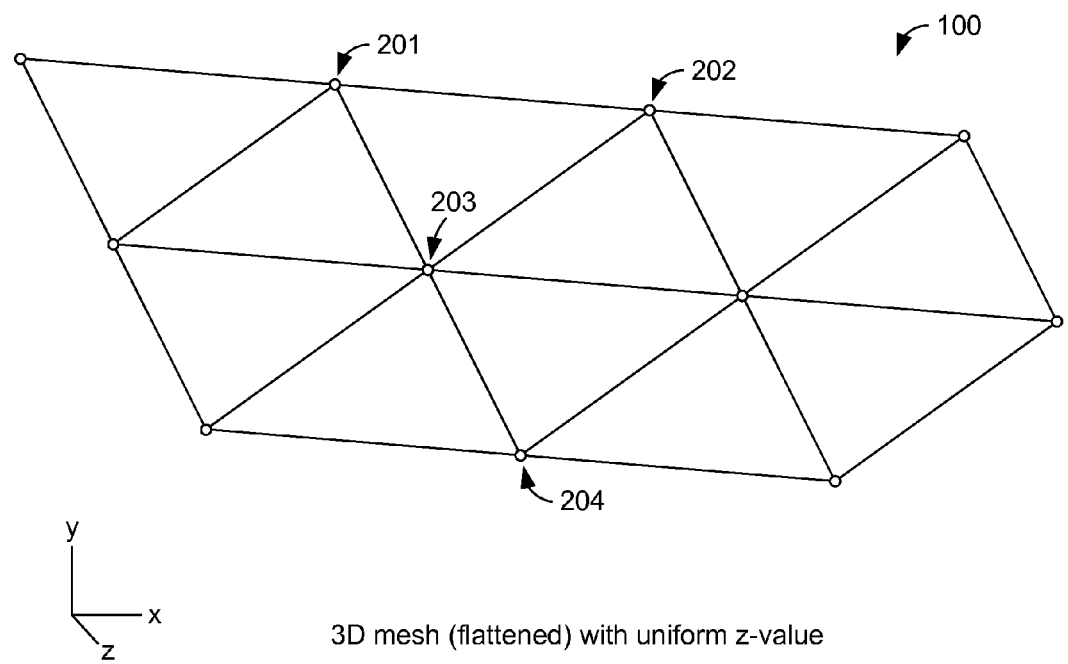
FIG. 2 is a conceptual diagram illustrating a flattened 3D mesh with a z-value and another flattened 3D mesh having a different z-value, according to some example embodiments.
Figure 2:
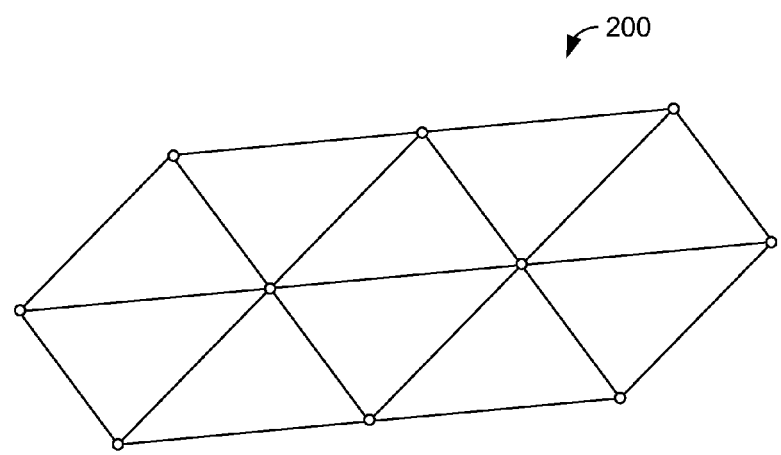

FIG. 2 is a conceptual diagram illustrating the flattened 3D mesh 100 with a uniform z-value being shown with another flattened 3D mesh 200 (e.g., a further 3D mesh) having a different uniform z-value, according to some example embodiments. For example, the 3D mesh 100 may have a z-value of 100 in the x-y-z space, while the 3D mesh 200 may have a different z-value of 107 in the same x-y-z space. According to various example embodiments, the 3D mesh 100 corresponds to a particular z-value (e.g., 100), and the 3D mesh 100 may be identified by that particular z-value. That is, the z-value may be an identifier of the 3D mesh 100. Similarly, the 3D mesh 200 may correspond to a different z-value (e.g., 107), and the 3D mesh 200 may be identified by that different z-value, with that different z-value being an identifier of the 3D mesh 200. Accordingly, the z-values of flattened 3D meshes may be used to identify individual 3D meshes.

As shown, the flattened 3D mesh 100 is a mesh of 3D vertices (e.g., 3D vertices 201, 202, 203, and 204). In some example embodiments, each of the 3D vertices, as generated, had individual depth values (e.g., z-values), and these individual depth values were ignored, assigned to a single (e.g., uniform) depth value, or both, during a flattening operation. In other words, the 3D vertices 201, 202, 203, and 204 may have been generated with the depth values that varied from one 3D vertex (e.g., 3D vertex 201) to another (e.g., 3D vertex 202). However, after the flattening of the 3D mesh 100, all of its 3D vertices (e.g., 3D vertices 201-204) have the same depth value (e.g., 100, 110, or null). Similarly, after flattening of the 3D mesh 200, all of its 3D vertices have the same depth value (e.g., 107, 110, or null).

Figure 3:
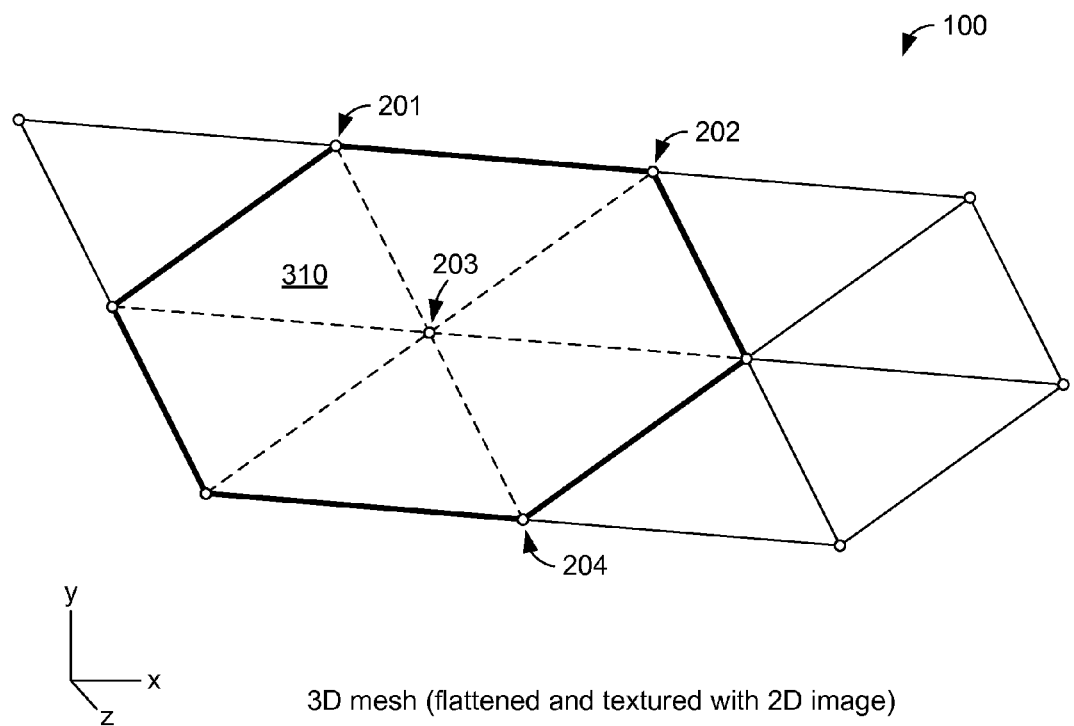
FIG. 3 is a conceptual diagram illustrating a flattened 3D mesh that is textured with a 2D image, according to some example embodiments.

FIG. 3 is a conceptual diagram illustrating the flattened 3D mesh 100 being textured with a 2D image 310, according to some example embodiments. The 2D image 310 is a picture (e.g., a bitmap), and the 2D image 310 may have any two-dimensional shape (e.g., square, rectangle, circle, triangle, or hexagon). The shape of the 2D image 310 may be described as its "natural" shape. For example, the 2D image 310 may be a rectangular array of pixels (e.g., 320 pixels wide and 240 pixels high) in a memory buffer and therefore have a rectangular natural shape (e.g., 320 pixels×240 pixels). Regardless of its natural shape, the 2D image 310 may be mapped (e.g., texture mapped) to the flattened 3D mesh 100 or any portion thereof (e.g., to a subset of the 3D vertices comprising the 3D mesh 100). In some example embodiments, mapping the 2D image 310 to the flattened 3D mesh 100 includes modifying the 2D image 310 (e.g., by cropping, stretching, or tiling the 2D image 310) to fit the flattened 3D mesh 100 or any portion thereof. As shown, the 2D image 310 is mapped to a hexagonal portion of the 3D mesh 100, and the hexagonal portion includes the 3D vertices 201-204. The mapping of the 2D image 310 may include associating one or more portions or edges of the 2D image 310 with one or more of the 3D vertices (e.g., 3D vertices 201-204) of the 3D mesh 100. For example, the center of the 2D image 310 may be mapped (e.g., associated) with the 3D vertex 203.

According to various example embodiments, the 2D image 310 may depict all or part of a 3D object. For example, as generated, the 3D mesh 100 may model a 3D object (e.g., an airplane, an animal, or a house), and the 2D image 310 may depict at least a portion of the 3D object (e.g., at least a portion of the airplane, the animal, or the house). As another example, as generated, the 3D mesh 100 may model a portion of the 3D object (e.g., a wing of an airplane, a leg of an animal, or a front door of a house), and the 2D image 310 may depict the portion of the 3D object.

Figure 4:
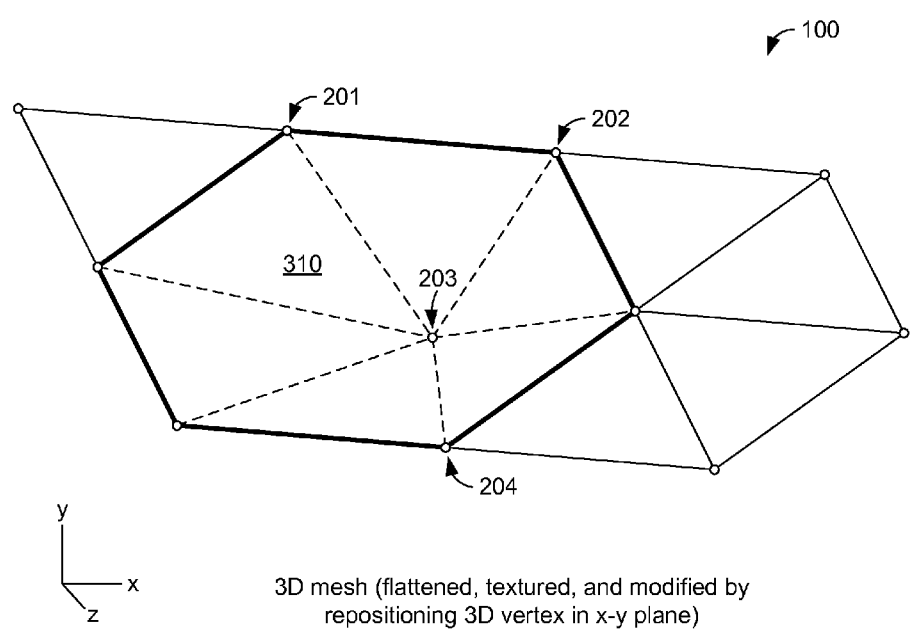
FIG. 4 is a conceptual diagram illustrating a flattened and textured 3D mesh being modified by repositioning a 3D vertex within an x-y plane, according to some example embodiments.

FIG. 4 is a conceptual diagram illustrating the flattened and textured 3D mesh 100 being modified by repositioning the 3D vertex 203 within the x-y plane, according to some example embodiments. Generally, any one or more of the 3D vertices in the 3D mesh 100 may be repositioned to modify the 3D mesh 100. In the example shown, the 3D vertex 203 is moved in the x-y plane from the position shown in FIG. 3 to the updated position shown in FIG. 4. According to some example embodiments, the 3D vertex 203 is moved in three dimensions, but any movement in the z-dimension is ignored.

In the example shown in FIG. 3-4, the 2D image 310 is mapped to at least the 3D vertices 201, 202, 203, and 204. Since the 2D image 310 is mapped to the 3D vertex 203 (e.g., in the center of the hexagonal area shown), the modifying of the 3D mesh 100 by the repositioning of the 3D vertex 203 distorts the 2D image 310 by repositioning (e.g., moving) at least a portion of the 2D image 310 (e.g., the center of the 2D image 310). In other words, the modifying of the 3D mesh 100 deforms the 2D image 310. Accordingly, movement of the 3D mesh 100 causes a corresponding movement (e.g., distortion or deformation) in the 2D image 310 mapped to the 3D mesh 100. This may have the effect of animating of the 2D image 310 in two dimensions (e.g., the x-y plane). However, this effect may be achieved by manipulating the 3D mesh 100, in its flattened and textured state, and such manipulation may be performed using one or more 3D graphics accelerators. In this manner, texture deformation may be used as a means of animation. According to various example embodiments, animation of one or more 3D vertices (e.g., 3D vertex 203) is constrained to 2D movement and thus provides an authoring technique (e.g., animation format) for 2D animation of a texture (e.g., 2D image 310) that is mapped thereto. Moreover, such an authoring technique may facilitate efficient 2D animation that is implementable on 3D graphics acceleration hardware.

Figure 5:
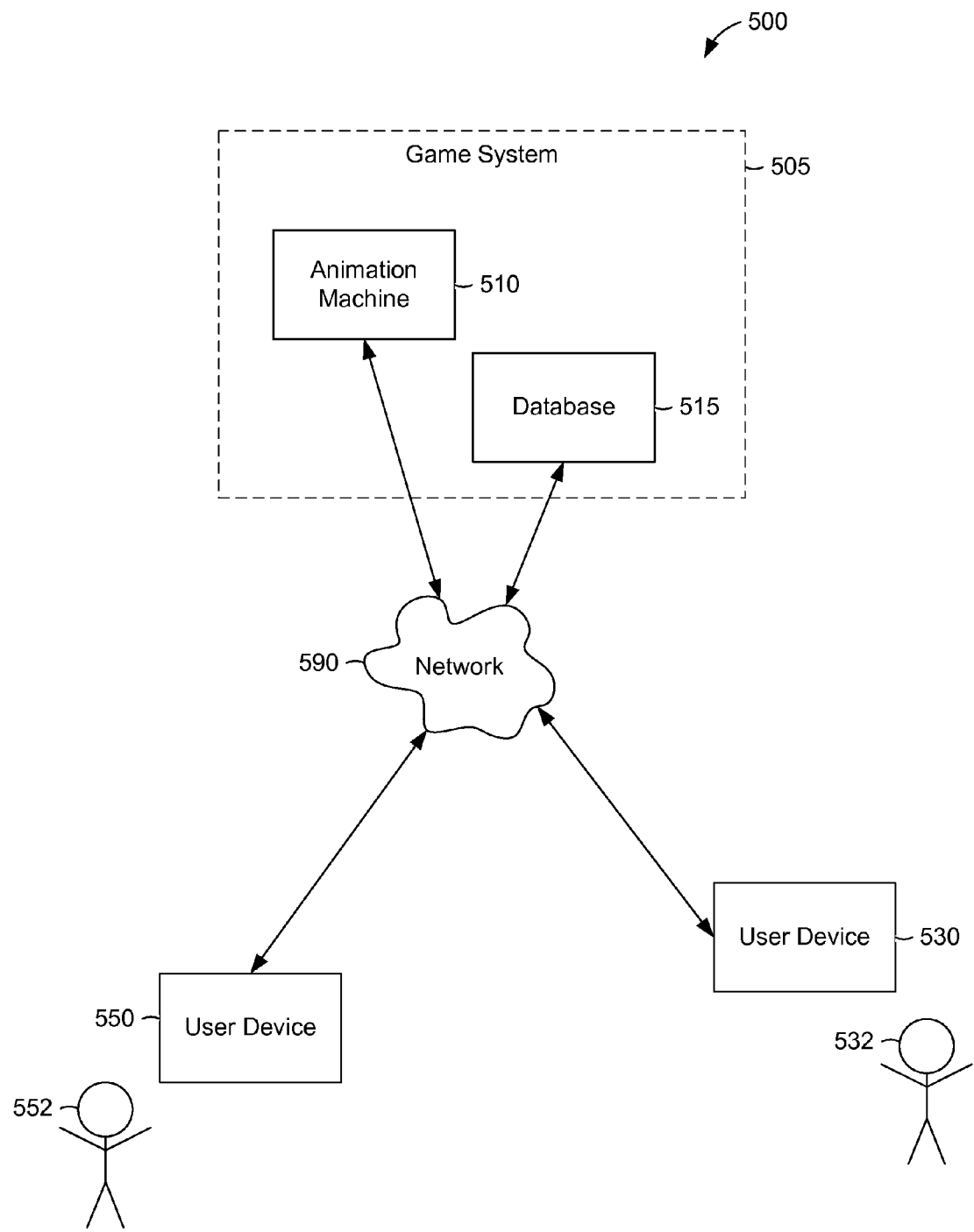
FIG. 5 is a network diagram illustrating a network environment suitable for facilitating generation of 2D animation from a 3D mesh, according to some example embodiments.

FIG. 5 is a network diagram illustrating a network environment 500 suitable for facilitating generation of 2D animation from a 3D mesh, according to some example embodiments. The network environment includes an animation machine 510, a database 515, and user devices 530 and 550, all communicatively coupled to each other via a network 590. Any one or more of the animation machine 510, the user device 530, and the user device 550 may be implemented in a computer system, in whole or in part, as described below with respect to FIG. 11.

The animation machine 510, the database 515, or both, may form all or part of a game system 505 that utilizes one or more of the methodologies described herein to facilitate generation of 2D animations from 3D meshes (e.g., 3D mesh 100). For example, the animation machine 510 may generate the 3D mesh 100 and store the 3D mesh 100 in the database 515 for subsequent use by the animation machine 510, the user device 530, the user device 550, or any suitable combination thereof. As another example, the animation machine 510 may generate the 3D mesh 100 and store the 3D mesh 100 itself, for subsequent use by the animation machine 510, the user device 530, the user device 550, or any suitable combination thereof. With access to the generated 3D mesh 100, the animation machine 510, the user device 530, the user device 550, or any suitable combination thereof, may generate a 2D animation from the 3D mesh 100.

The database 515 is a data repository (e.g., a storage device) that stores information maintained by the animation machine 510 and accessible by the animation machine 510, the user device 530, the user device 550, or any suitable combination thereof. This information may include one or more generated 3D meshes (e.g., 3D mesh 100 and 3D mesh 200), one or more 2D images (e.g., 2D image 310), one or more animations (e.g., generated based on 2D frames rendered from the 3D mesh 100), or any suitable combination thereof.

Also shown in FIG. 5 are users 532 and 552. One or both of the users 532 and 552 may be a human user (e.g., a human being), a machine user (e.g., a computer configured by a software program to interact with the user device 530), or any suitable combination thereof (e.g., a human assisted by a machine or a machine supervised by a human). The user 532 is not part of the network environment 500, but is associated with the user device 530 and may be a user of the user device 530. For example, the user device 530 may be a personal computer, a tablet computer, or a smart phone belonging to the user 532. Likewise, the user 552 is not part of the network environment 500, but is associated with the user device 550. As an example, the user device 550 may be a personal computer, a tablet computer, or a smart phone belonging to the user 552.

Any of the machines, databases, or devices shown in FIG. 5 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database, a triple store, or any suitable combination thereof. Moreover, any two or more of the machines illustrated in FIG. 5 may be combined into a single machine, and the functions described herein for any single machine may be subdivided among multiple machines.

The network 590 may be any network that enables communication between machines (e.g., animation machine 510 and the user device 530). Accordingly, the network 590 may be a wired network, a wireless network (e.g., a mobile network), or any suitable combination thereof. The network 590 may include one or more portions that constitute a private network, a public network (e.g., the Internet), or any suitable combination thereof.

Figure 6:
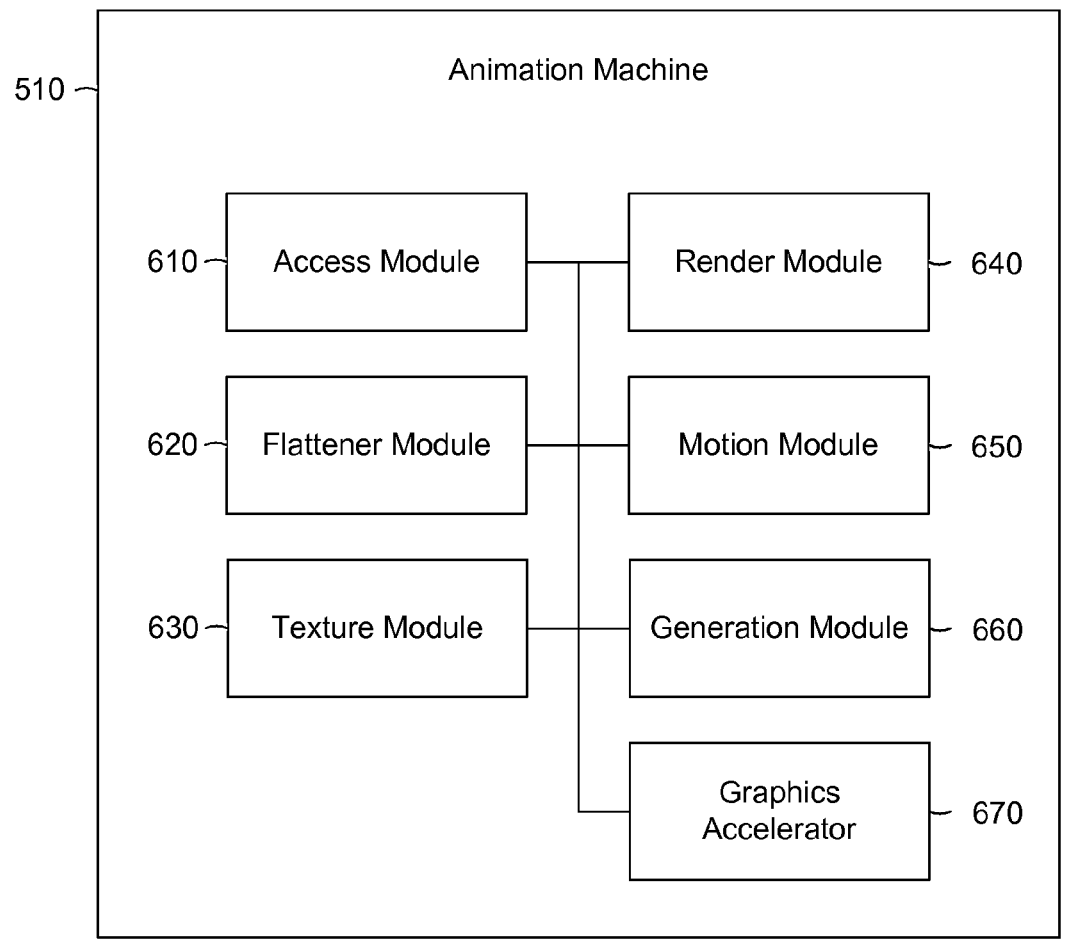
FIG. 6 is a block diagram illustrating components of an animation machine suitable for facilitating generation of 2D animation from a 3D mesh, according to some example embodiments.

FIG. 6 is a block diagram illustrating components of the animation machine 510, according to some example embodiments. According to various example embodiments, the animation machine 510 may perform all or part of the methodologies described herein for generating 2D animation from the 3D mesh 100. The animation machine 510 includes an access module 610, a flattener module 620, a texture module 630, a render module 640, a motion module 650, a generation module 660, and a graphics accelerator 670, all configured to communicate with each other (e.g., via a bus, shared memory, or a switch). Any one or more of the modules described herein may be implemented using hardware (e.g., a processor of a machine) or a combination of hardware and software. Moreover, any two or more of these modules may be combined into a single module, and the functions described herein for a single module may be subdivided among multiple modules. In particular, as noted above, the graphics accelerator 670 may be, or include, graphics acceleration hardware (e.g., 3D graphics acceleration hardware).

Operations performable by the various modules 610-670 of the animation machine 510 are described below with respect to FIG. 8-10. In some example embodiments, one or more modules of the animation machine 510 (e.g., generation module 660) perform a portion of the methods discussed herein, and one or more modules of the user device 530 perform other portions of the methods discussed herein.

Figure 7:
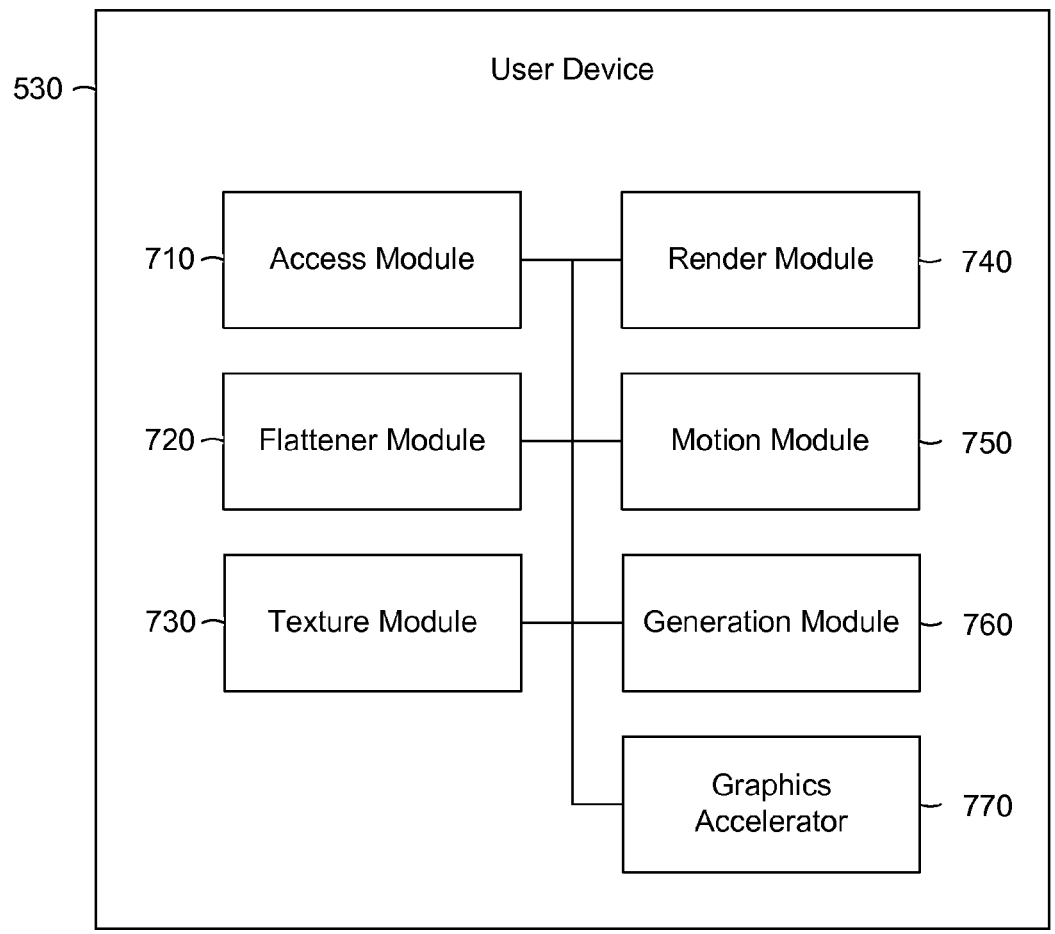
FIG. 7 is a block diagram illustrating components of a user device suitable for facilitating generation of 2D animation from a 3D mesh, according to some example embodiments.

FIG. 7 is a block diagram illustrating components of the user device 530, according to some example embodiments. According to various example embodiments, the user device 530 may perform all or part of the methodologies described herein for generating 2D animation from the 3D mesh 100. The user device 530 includes an access module 710, a flattener module 720, a texture module 730, a render module 740, a motion module 750, a generation module 760, and a graphics accelerator 770, all configured to communicate with each other (e.g., via a bus, shared memory, or a switch). Any one or more of the modules described herein may be implemented using hardware (e.g., a processor of a machine) or a combination of hardware and software. Moreover, any two or more of these modules may be combined into a single module, and the functions described herein for a single module may be subdivided among multiple modules. In particular, as noted above, the graphics accelerator 770 may be, or include, graphics acceleration hardware.

Operations performable by the various modules 710-770 of the user device 530 are described below with respect to FIG. 8-10. In some example embodiments, one or more modules of the animation machine 510 (e.g., generation module 660) perform a portion of the methods discussed herein, and one or more modules (e.g., render module 740) of the user device 530 perform other portions of the methods discussed herein.

Figure 8:
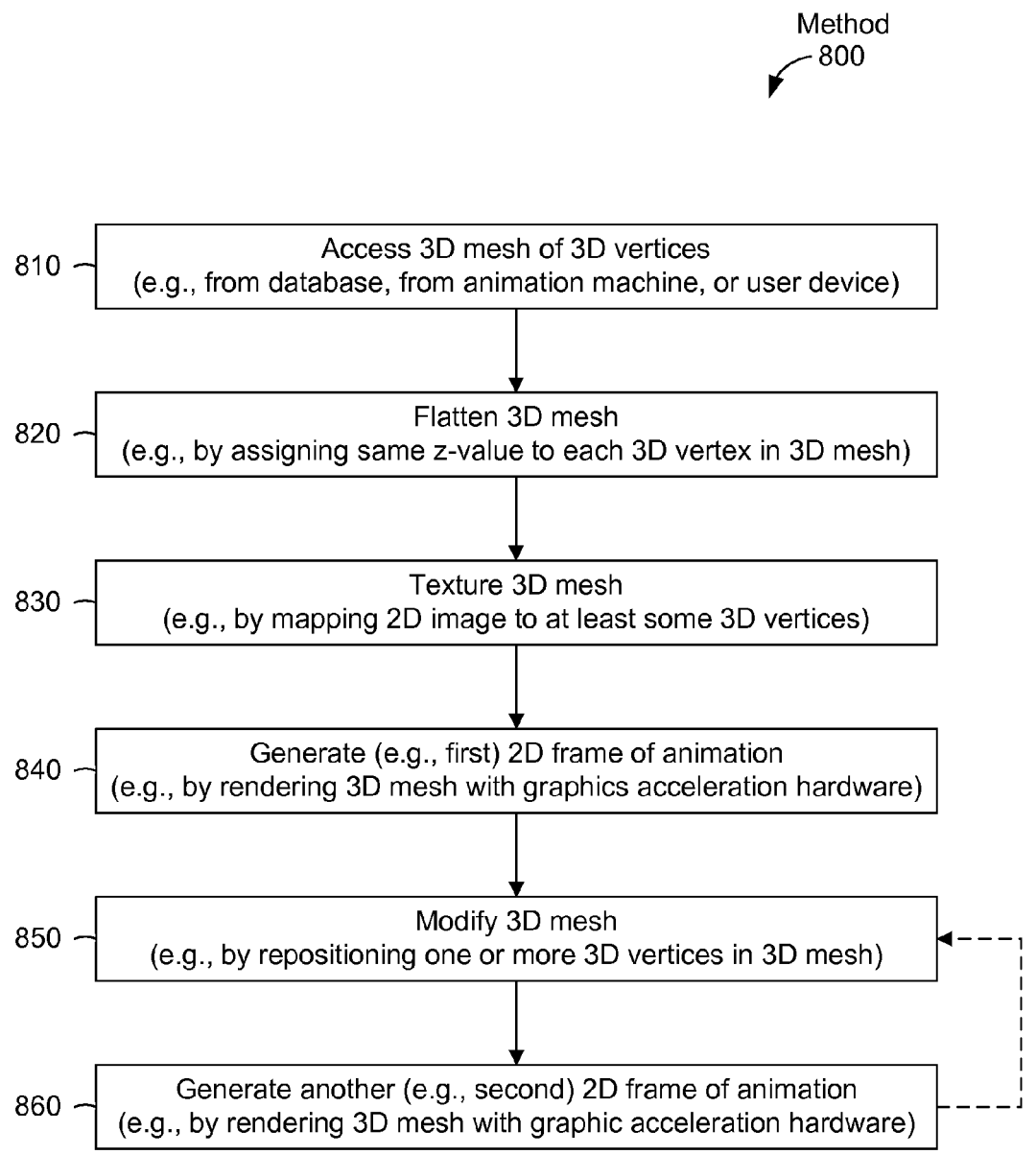
FIG. 8-10 are flowcharts illustrating operations in performing a method of generating 2D animation from a 3D mesh, according to some example embodiments.
Figure 9:
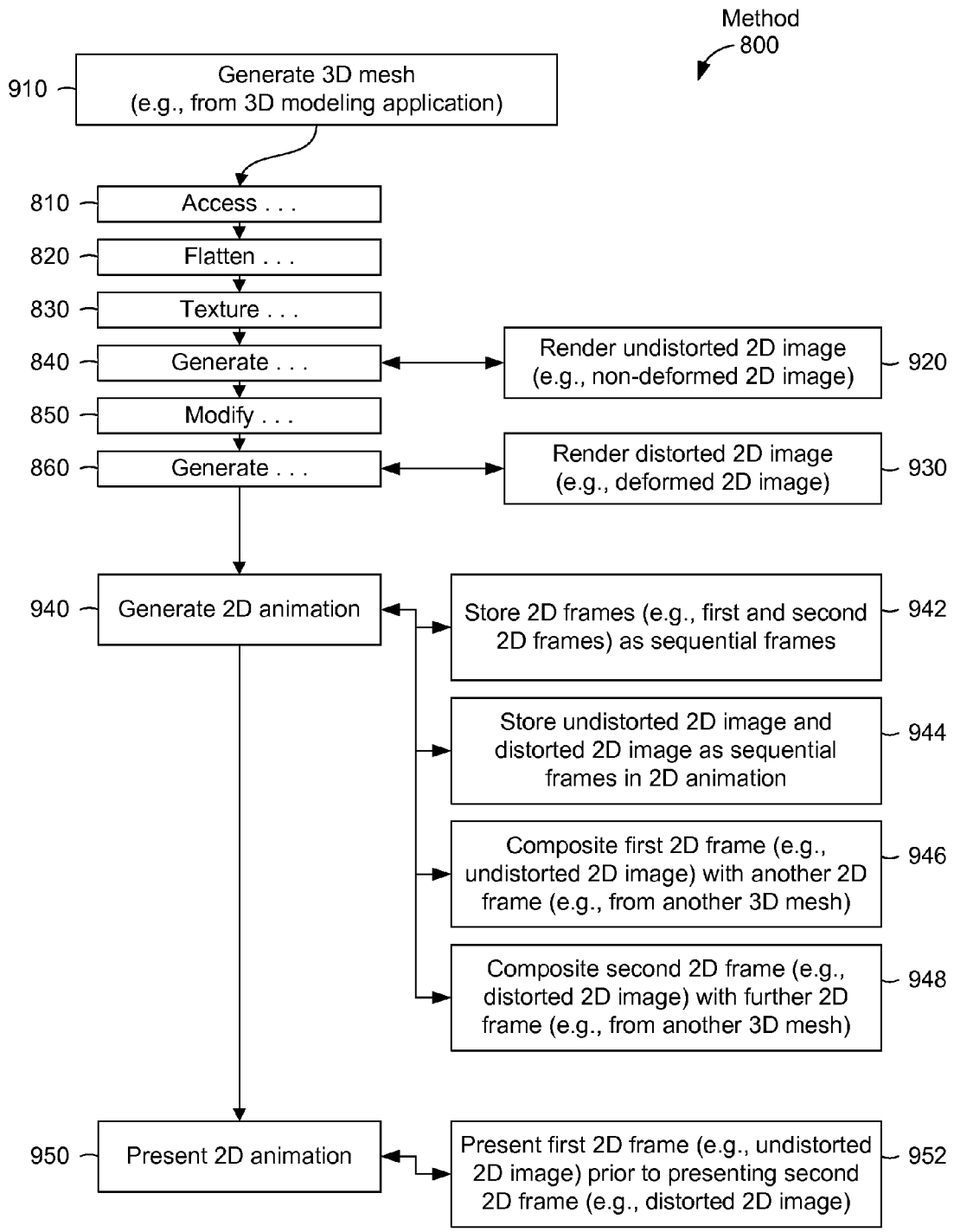
Figure 10:
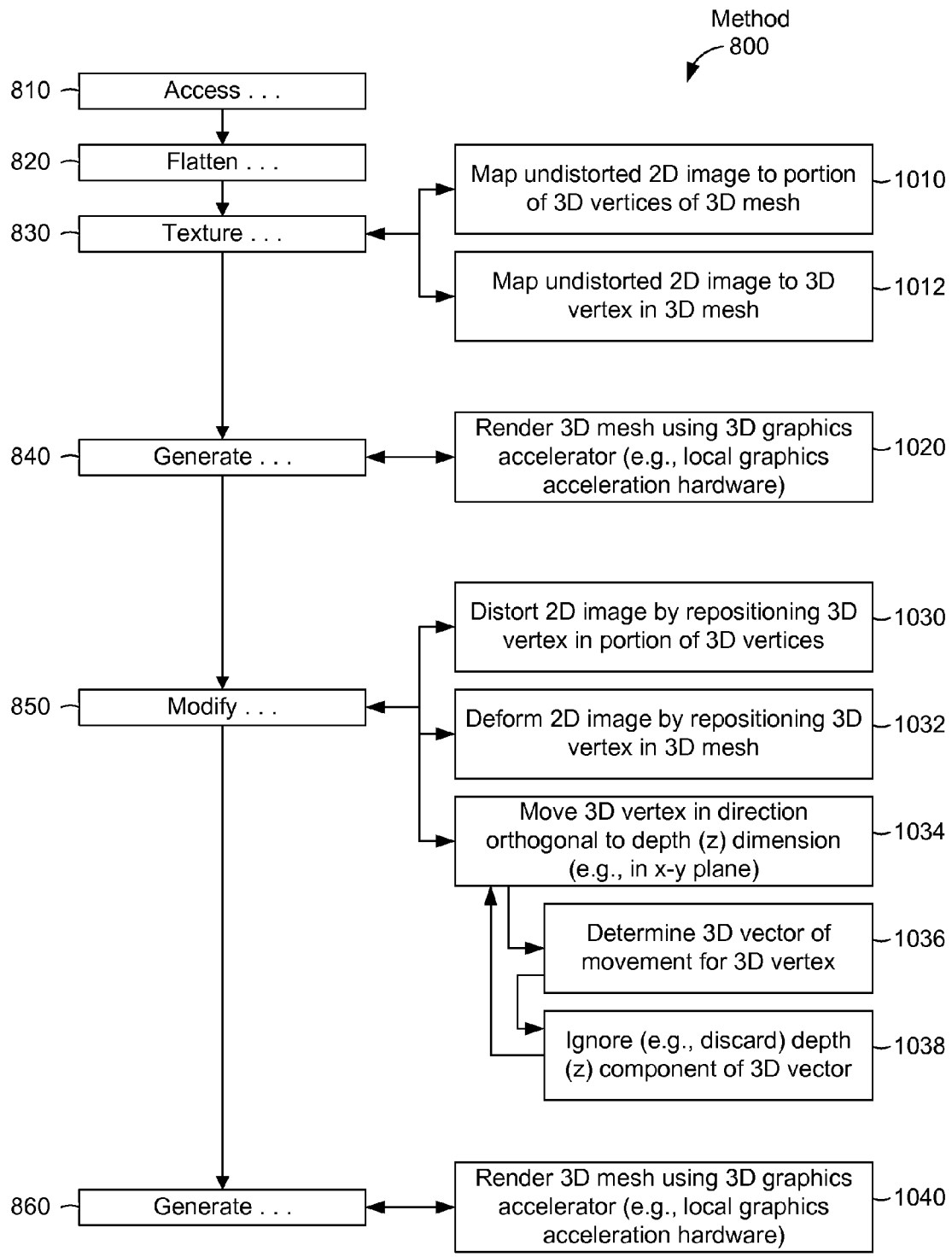

FIG. 8-10 are flowcharts illustrating operations in performing a method 800 of generating 2D animation from the 3D mesh 100, according to some example embodiments. Operations in the method 800 may be performed by the animation machine 510, using modules shown in FIG. 6, or by a user device (e.g., user device 530), using modules shown in FIG. 7. In some example embodiments, a portion of the method 800 (e.g., generation and flattening of the 3D mesh 100) is performed by the animation machine 510, and another portion of the method 800 (e.g., texturing and rendering the 3D mesh 100) is performed by the user device 530. In the example shown in FIG. 8, the method 800 includes operations 810, 820, 830, 840, 850, 860. For clarity, operations 810-860 are described as being performed by modules of the animation machine 510. In certain example embodiments, however, one or more of the operations 810-860 may be performed by the analogous modules of the user device 530.

In operation 810, the access module 610 accesses the 3D mesh 100 (e.g., from the database 515). The 3D mesh 100 includes 3D vertices that are each represented in three dimensions, where one of the three dimensions is a depth dimension (e.g., z-dimension) that is normal to a viewing plane (e.g., a display screen) and where two of the three dimensions (e.g., x-dimension and y-dimension) are each normal to the depth dimension.

In operation 820, the flattener module 620 flattens the 3D mesh 100 by assigning a single value of the depth dimension (e.g., a single z-value) to each of the 3D vertices in the 3D mesh 100 (e.g., 3D vertices 201-204). The flattened 3D mesh 100 remains three-dimensional, since its 3D vertices all have depth values (e.g., z-values). As noted above, the single value of the depth dimension may correspond to the flattened 3D mesh 100 and may identify the flattened 3D mesh 100 as being distinct from a further flattened 3D mesh (e.g., 3D mesh 200).

In operation 830, the texture module 630 textures the flattened 3D mesh 100 by mapping the 2D image 310 to at least some of the 3D vertices (e.g., 3D vertices 201-204) of the 3D mesh 100. As noted above, the flattened 3D mesh 100 remains three-dimensional, and its 3D vertices (e.g., 3D vertices 201-204) remain assigned to the single value of the depth dimension.

In operation 840, the render module 640 generates a 2D frame of an animation (e.g., a first 2D frame) by rendering the flattened and textured 3D mesh 100 to which the 2D image 310 is mapped. That is, the render module 640 may generate the 2D frame based on the unmodified 3D mesh 100, on the undistorted 2D image 310, or both. In some example embodiments, the render module 640 may use the graphics accelerator 670 in performing operation 840.

In operation 850, the motion module 650 modifies the flattened and textured 3D mesh 100 by repositioning the 3D vertex 203 (e.g., with respect to the 3D vertices 201, 202, and 204) within the flattened and textured 3D mesh 100. Operation 850 also includes maintaining the single value of the depth dimension assigned in operation 820 to each of the 3D vertices in the 3D mesh 100. In particular, the repositioning of the 3D vertex 203 may be performed while maintaining the single value of the depth dimension (e.g., the single z-value). As noted above, the modifying of the flattened and textured 3D mesh 100 distorts (e.g., deforms) the 2D image 310 that is mapped to at least some of the 3D vertices (e.g., 3D vertex 203) of the flattened and textured 3D mesh 100. The flattened, textured, and modified 3D mesh 100 remains three-dimensional, and its 3D vertices (e.g., 3D vertices 201-204) remain assigned to the single value of the depth dimension, as discussed above with respect to operation 820.

In operation 860, the render module 640 generates another 2D frame of the animation (e.g., a second 2D frame) by rendering the flattened, textured, and modified 3D mesh 100 to which the distorted (e.g., deformed) 2D image 310 remains mapped (e.g., texture mapped). That is, the render module 640 may generate this other 2D frame based on the modified 3D mesh 100, on the distorted 2D image 310, or both. In some example embodiments, the render module 640 may use the graphics accelerator 670 in performing operation 860.

According to various example embodiments, the method 800 may iteratively perform multiple instances of operations 850 and 860 to generate multiple 2D frames of the animation. By looping through operations 850 and 860, any number of 2D frames may be generated by modifying and rendering the 3D mesh 100 and 2D image 310 which is mapped thereto.

As shown in FIG. 9, the method 800 may include one or more of operations 910, 920, 930, 940, 942, 944, 946, 948, 950, and 952. For clarity, operations 910-952 are described as being performed by modules of the animation machine 510. In certain example embodiments, however, one or more of the operations 910-952 may be performed by the analogous modules of the user device 530.

In operation 910, the generation module 660 generates the 3D mesh 100 and stores the 3D mesh 100 (e.g., in the database 515, at the animation machine 510, or both). Generation of the 3D mesh 100 may be based on geometric data describing a 3D object (e.g., an airplane, the animal, or a house) or a portion thereof. Operation 910 may include generating one or more of the 3D vertices (e.g., 3D vertices 201-204) of the 3D mesh 100 and may include representing each of the 3D vertices in three dimensions (e.g., x-y-z space). The generation module 660 may use (e.g., control, launch, or initiate) 3D modeling software (e.g., a 3D modeling application) in the performance of operation 910.

Operation 920 may be performed as part (e.g., a precursor task, a subroutine, or a portion) of operation 840, in which the render module 640 generates a 2D frame (e.g., a first 2D frame) of animation based on the flattened, textured, and unmodified 3D mesh 100. In operation 920, the render module 640 renders the undistorted 2D image 310 that is mapped to at least a portion of the flattened, textured, and unmodified 3D mesh 100. This may have the effect of rendering the 2D image 310 in a state prior to the repositioning of the 3D vertex 203 in operation 850.

Operation 930 may be performed as part (e.g., a precursor task, a subroutine, or a portion) of operation 860, in which the render module 640 generates another 2D frame (e.g., a second 2D frame) of animation based on the flattened, textured, and modified 3D mesh 100. In operation 930, the render module 640 renders the distorted 2D image 310 that is mapped to at least a portion of the flattened, textured, and modified 3D mesh 100. This may have the effect of rendering the 2D image 310 in an updated state subsequent to the repositioning of the 3D vertex 203 in operation 850.

In operation 940, the render module 640 generates an animation (e.g., 2D animation) based on the 2D frames generated in operations 840 and 860 (e.g., the first and second 2D frames). In the generated animation, the 2D frames may be sequential 2D frames. For example, within the animation, the 2D frame generated in operation 840 may precede the 2D frame generated in operation 860.

One or more of operations 942-948 may be performed as part (e.g., a precursor task, a subroutine, or a portion) of operation 940. In operation 942, the render module 640 stores the generated 2D frames from operations 840 and 860 (e.g., the first 2D frame and the second 2D frame) as sequential frames in the animation. The render module 640 may store the animation in the database 515 (e.g., as a single data file), provide the animation to one or more user devices (e.g., user device 550) for presentation, or both.

In operation 944, the render module 640 stores the undistorted 2D image 310 (e.g., as rendered in operation 920) and the distorted 2D image 310 (e.g., as rendered in operation 930) as sequential frames in the animation. As noted above, the render module 640 may store the animation in the database 515, provide the animation to one or more user devices for presentation, or both.

In operation 946, the render module 640 composites (e.g., mixes, combines, or concatenates) the 2D frame generated in operation 840 (e.g., the first 2D frame) with one or more 2D frames generated in corresponding operations performed on another 3D mesh 200. For example, the render module 640 may composite a set (e.g., a first set) of 2D frames generated from unmodified 3D meshes and undistorted 2D images that are texture mapped thereon.

In operation 948, the render module 640 composites the 2D frame generated in operation 860 (e.g., the second 2D frame) with one or more 2D frames generated in corresponding operations performed on the other 3D mesh 200. For example, the render module 640 may composite another set (e.g., a second set) of 2D frames generated from modified 3D meshes and distorted 2D images that are texture mapped thereon.

The combination of operations 946 and 948 may have the effect of enabling complex animations to be generated (e.g., depicting multiple moving portions of a 3D object). For example, an animation of a walking animal with four legs may be generated by separately animating a 3D mesh for each of the four legs (e.g., in addition to animating separate 3D meshes for the animal's face, ears, and tail). As noted above, each portion of the animal (e.g., each leg) may be modeled by a separate 3D mesh, which may be identified by its depth value (e.g., z-value) assigned to each of its 3D vertices. Accordingly, the depth dimension may be used to identify and distinguish different flattened 3D meshes, where the 3D meshes respectively correspond to portions of a single 3D model (e.g., the animal) being animated.

In operation 950, the render module 640 presents the animation generated in operation 940. For example, the render module 640 may provide the animation to a user device (e.g., user device 550) for presentation on a display screen of that user device. As another example, the render module 640 may directly cause the animation to be displayed on a display screen of the animation machine 510 or connected thereto.

Operation 952 may be performed as part (e.g., a precursor task, a subroutine, or a portion) of operation 950, in which the render module 640 presents the animation. In operation 952, the render module 640 presents the 2D frame generated in operation 840 (e.g., generated from the flattened, textured, and unmodified 3D mesh 100 to which the undistorted 2D image 310 is mapped) prior to presenting the 2D frame generated in operation 860 (e.g., generated from the flattened, textured, and modified 3D mesh 100 to which the distorted 2D image 310 is mapped). In some example embodiments, the render module 640 performs operation 952 by presenting the undistorted 2D image 310 (e.g., as rendered in operation 920) prior to presenting the distorted 2D image 310 (e.g., as rendered in operation 930).

As shown in FIG. 10, the method 800 may include one or more of operations 1010, 1012, 1020, 1030, 1032, 1034, 1036, 1038, and 1040. For clarity, operations 1010-1040 are described as being performed by modules of the animation machine 510. In certain example embodiments, however, one or more of the operations 1010-1040 may be performed by the analogous modules of the user device 530.

One or more of operations 1010 and 1012 may be performed as part (e.g., a precursor task, a subroutine, or a portion) of operation 830, in which the texture module 630 textures the flattened 3D mesh 100. In operation 1010, the texture module 630 maps (e.g., texture maps) the undistorted 2D image 310 to a portion of the 3D vertices that comprise the flattened 3D mesh 100 (e.g., 3D vertices 201-204). For example, the mapping of the undistorted 2D image 310 may include associating one or more portions or edges of the undistorted 2D image 310 with a subset of the 3D vertices in the 3D mesh 100. In example embodiments that include operation 1010, the repositioning of the 3D vertex 203 in operation 850 may distort the 2D image 310 that is mapped to the portion of the 3D vertices. Moreover, the portion of the 3D vertices may include the 3D vertex 203, which is repositioned in operation 850.

In operation 1012, the texture module 630 maps at least a portion of the undistorted 2D image 310 to the 3D vertex 203 in the flattened 3D mesh 100. For example, the center or centroid of the 2D image 310 may be mapped (e.g., associated) with the 3D vertex 203. As noted above, the 3D vertex 203 is subject to repositioning in operation 850. Accordingly, operation 1012 involves mapping at least a portion of the undistorted 2D image 310 to the 3D vertex 203 that will be repositioned in operation 850. In example embodiments that include operation 1012, the repositioning of the 3D vertex 203 in operation 850 may deform the 2D image 310 that is mapped to the 3D vertex 203.

Operation 1020 may be performed as part (e.g., a precursor task, a subroutine, or a portion) of operation 840, in which the render module 640 generates the 2D frame of animation (e.g., the first 2D frame) based on the flattened, textured, and unmodified 3D mesh 100. In operation 1020, the render module 640 generates the 2D frame by rendering the flattened, textured, and unmodified 3D mesh 100 using the graphics accelerator 670. As noted above, the graphics accelerator 670 may be, or include, graphics acceleration hardware (e.g., graphics acceleration hardware that is local to the animation machine 510).

One or more of operations 1030, 1032, and 1034 may be performed as part (e.g., a precursor task, a subroutine, or a portion) of operation 850, in which the motion module 650 modifies the flattened and textured 3D mesh 100 (e.g., by repositioning the 3D vertex 203 in the 3D mesh 100). As noted above with respect to operation 1010, the undistorted 2D image 310 may be mapped to a portion of the 3D vertices of the 3D mesh 100. In operation 1030, the motion module 650 distorts the 2D image 310 that is mapped to this portion of the 3D vertices.

As noted above with respect to operation 1012, the undistorted 2D image 310 may be mapped to the 3D vertex 203, which is subject to repositioning in operation 850. In operation 1032, the motion module 650 deforms the 2D image 310 that is mapped to this 3D vertex 203.

In operation 1034, the motion module 650 moves the 3D vertex 203 (e.g., with respect to other 3D vertices in the 3D mesh 100) in a direction orthogonal to the depth dimension (e.g., z-dimension in x-y-z space). Operation 1034 may be performed as part of the repositioning of the 3D vertex 203 while maintaining the single value (e.g., a single z-value) of the depth dimension of the 3D vertex 203, discussed above with respect to operation 850. The 3D vertex 203 is still three-dimensional after being moved, and the 3D vertex 203 continues to have the single value of the depth dimension that is assigned to the 3D vertices (e.g., 3D vertices 201-204) of the flattened 3D mesh 100.

According to some example embodiments, the movement of the 3D vertex 203 in operation 1034 is described by a 3D vector, but the maintaining of a single z-value for the depth dimension of the 3D vertex 203 constrains the movement to a two-dimensional plane that is orthogonal to the depth dimension. Hence, one or more of operations 1036 and 1038 may be performed as part (e.g., a precursor task, a subroutine, or a portion) of operation 1034, in which the motion module 650 moves the 3D vertex 203. In operation 1036, the motion module 650 determines a 3D vector of movement for the 3D vertex 203. The 3D vector of movement may have an x-component, a y-component, and a z-component. In operation 1038, the motion module 650 ignores a component of the 3D vector in the depth dimension. For example, the motion module 650 may ignore the z-component of the 3D vector of movement. This may have the effect of constraining the movement of the 3D vertex 203 to one or both of the dimensions that are orthogonal to the depth dimension.

Operation 1040 may be performed as part (e.g., a precursor task, a subroutine, or a part) of operation 860, in which the render module 640 generates the further 2D frame of animation (e.g., the second 2D frame) based on the flattened, textured, and modified 3D mesh 100. In operation 1040, the render module 640 generates the 2D frame by rendering the flattened, textured, and modified 3D mesh 100 using the graphics accelerator 670. As noted above, the graphics accelerator 670 may be, or include, graphics acceleration hardware (e.g., graphics acceleration hardware that is local to the animation machine 510).

According to various example embodiments, one or more of the methodologies described herein may facilitate generation of a 2D animation from one or more 3D meshes. Moreover, one or more of the methodologies described herein may facilitate efficient rendering of a 2D animation using 3D graphics acceleration hardware. Hence, one or more the methodologies described herein may facilitate efficient production of 2D animations in the context of game applications, educational applications, presentation applications, or other communication applications in which movement of a 3D object is depicted.

When these effects are considered in aggregate, one or more of the methodologies described herein may obviate a need for certain efforts or resources that otherwise would be involved in generating 2D or 3D animations. Efforts expended by an animator in generating sprite-based 2D animation or complex movements of a 3D object in 3D space may be reduced by one or more of the methodologies described herein. Computing resources used by one or more machines, databases, or devices (e.g., within the network environment 500) may similarly be reduced. Examples of such computing resources include processor cycles, network traffic, memory usage, data storage capacity, power consumption, and cooling capacity.

Figure 11:
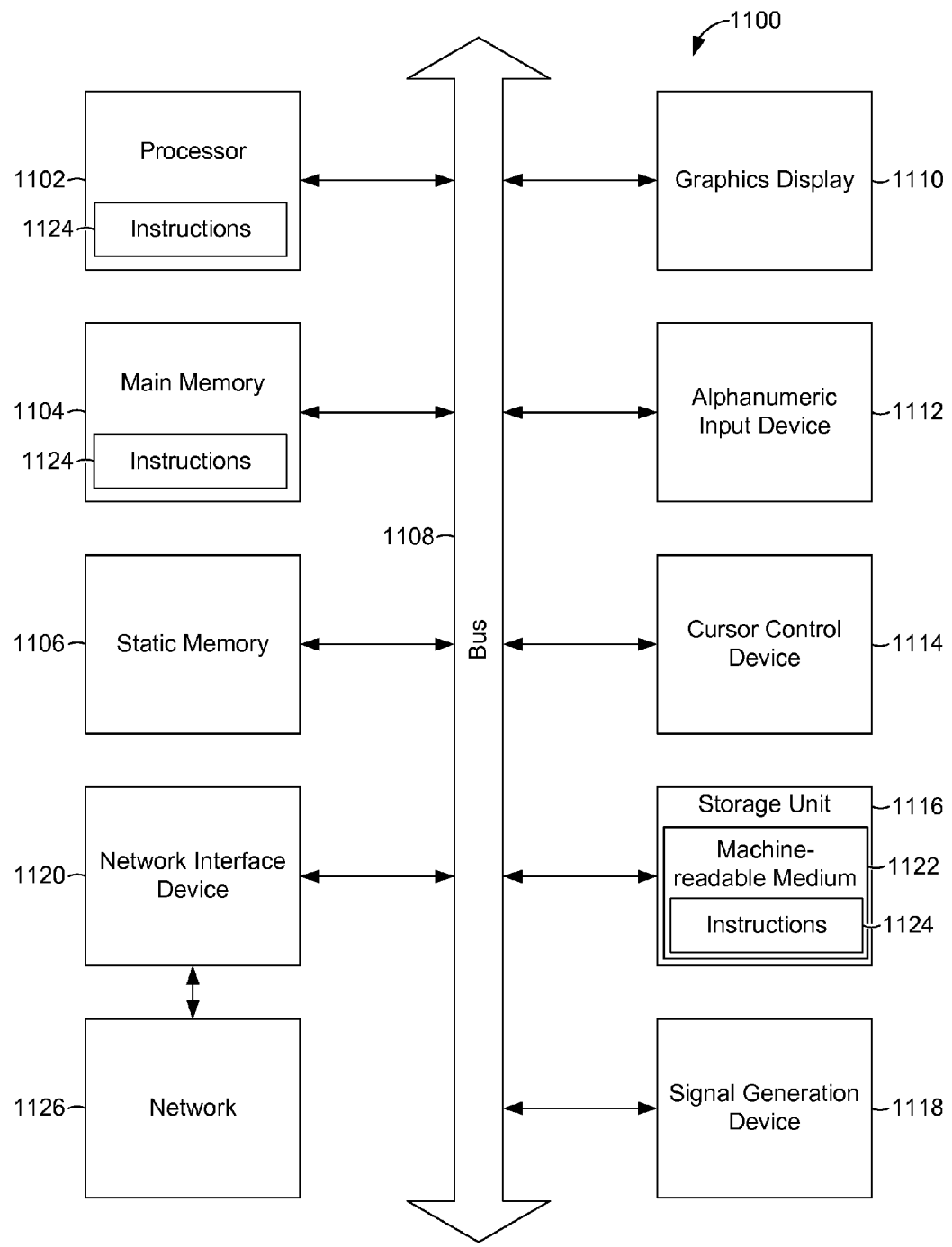
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system and within which instructions 1124 (e.g., software) for causing the machine 1100 to perform any one or more of the methodologies discussed herein may be executed. In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a peer-to-peer (or distributed) network environment. The machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include a collection of machines that individually or jointly execute the instructions 1124 to perform any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The machine 1100 may further include a graphics display 1110 (e.g., a plasma display panel (PDP), a light emitting diode (LED) display, a liquid crystal display (LCD), a projector, or a cathode ray tube (CRT)). The machine 1100 may also include an alphanumeric input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a speaker), and a network interface device 1120.

The storage unit 1116 includes a machine-readable medium 1122 on which is stored the instructions 1124 (e.g., software) embodying any one or more of the methodologies or functions described herein. The instructions 1124 may also reside, completely or at least partially, within the main memory 1104, within the processor 1102 (e.g., within the processor's cache memory), or both, during execution thereof by the machine 1100. Accordingly, the main memory 1104 and the processor 1102 may be considered as machine-readable media. The instructions 1124 may be transmitted or received over a network 1126 (e.g., network 190) via the network interface device 1120.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium that is capable of storing instructions (e.g., software) for execution by a machine (e.g., machine 1100), such that the instructions, when executed by one or more processors of the machine (e.g., processor 1102), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following descriptions define various example embodiments of methods and systems (e.g., apparatus) discussed herein:

1. A method comprising:

accessing a 3D mesh of 3D vertices each represented in three dimensions, one of the three dimensions being a depth dimension that is normal to a viewing plane, two of the three dimensions each being normal to the depth dimension;

flattening the 3D mesh by assigning a single value of the depth dimension to each of the 3D vertices in the 3D mesh;

texturing the flattened 3D mesh by mapping a 2D image to at least some of the 3D vertices each represented in the three dimensions and each assigned the single value of the depth dimension that is normal to the viewing plane;

generating a first 2D frame of an animation by rendering the flattened and textured 3D mesh to which the 2D image is mapped;

modifying the flattened and textured 3D mesh by repositioning a 3D vertex among the 3D vertices while maintaining the single value of the depth dimension assigned to each of the 3D vertices, the modifying of the flattened and textured 3D mesh distorting the 2D image that is mapped to at least some of the 3D vertices of the flattened and textured 3D mesh, the modifying being performed by a processor of a machine; and generating a second 2D frame of the animation by rendering the flattened, textured, and modified 3D mesh to which the distorted 2D image is mapped.

2. The method of description 1, wherein:
the single value of the depth dimension corresponds to the flattened 3D mesh; and
a further value of the depth dimension corresponds to a further flattened 3D mesh.

3. The method of description 1, wherein:
the single value of the depth dimension identifies the flattened 3D mesh as being distinct from a further flattened 3D mesh that is identified by a further value of the depth dimension.

4. The method of description 1, wherein:
the 3D mesh models a 3D object; and
the 2D image depicts at least a portion of the 3D object.

5. The method of description 1, wherein:
the 3D mesh models a portion of a 3D object; and
the 2D image depicts the portion of the 3D object.

6. The method of description 1, wherein:
the rendering of the textured, flattened, and modified 3D mesh includes rendering the distorted 2D image that is mapped to the textured, flattened, and modified 3D mesh.

7. The method of description 1 further comprising:
generating the animation by storing the first 2D frame and the second 2D frame as sequential frames in the animation,
the first 2D frame being generated from the flattened and textured 3D mesh,
the second 2D frame being generated from the flattened, textured, and modified 3D mesh with the repositioned 3D vertex among the 3D vertices.

8. The method of description 1 further comprising:
generating the animation by storing the undistorted 2D image and the distorted 2D image as frames in the animation,
the undistorted 2D image being mapped to the flattened and textured 3D mesh prior to the repositioning of the 3D vertex among the 3D vertices,
the distorted 2D image being mapped to the flattened, textured, and modified 3D mesh with the repositioned 3D vertex among the 3D vertices.

9. The method of description 1 further comprising:
generating the animation by:
compositing the first 2D frame with another 2D frame generated from a further 3D mesh that is flattened and textured; and
compositing the second 2D frame with a further 2D frame generated from the further 3D mesh that is flattened, textured, and modified by a repositioning of a 3D vertex included in the further 3D mesh.

10. The method of description 1 further comprising:
presenting the animation by presenting the first 2D frame prior to presenting the second 2D frame,
the first 2D frame being generated by rendering the flattened, textured, and unmodified 3D mesh to which the undistorted 2D image is mapped,
the second 2D frame being generated by rendering the flattened, textured, and modified 3D mesh to which the distorted 2D image is mapped.

11. The method of description 1, wherein:
the texturing of the flattened 3D mesh includes mapping the 2D image to a portion of the 3D vertices that includes the 3D vertex; and
the repositioning of the 3D vertex distorts the 2D image mapped to the portion of the 3D vertices that includes the 3D vertex.

12. The method of description 1, wherein:
the texturing of the flattened 3D mesh includes mapping the undistorted 2D image to the 3D vertex; and
the repositioning of the 3D vertex deforms the 2D image mapped to the 3D vertex.

13. The method of description 1, wherein:
the repositioning of the 3D vertex while maintaining the single value of the depth dimension of the 3D vertex includes moving the 3D vertex in a direction orthogonal to the depth dimension.

14. The method of description 1, wherein:
the repositioning of the 3D vertex while maintaining the single value of the depth dimension of the 3D vertex includes:
determining a 3D vector of movement for the 3D vertex; and
ignoring a component of the 3D vector in the depth dimension.

15. The method of description 1, wherein:
the generating of the first 2D frame of the animation includes rendering the flattened and textured 3D mesh by using 3D graphics acceleration hardware.

16. The method of description 1, wherein:
the generating of the second 2D frame of the animation includes rendering the flattened, textured, and modified 3D mesh by using 3D graphics acceleration hardware.

17. A non-transitory machine-readable storage medium comprising instructions that, when executed by one or more processors of a machine, cause the machine to perform operations comprising:
accessing a 3D mesh of 3D vertices each represented in three dimensions, one of the three dimensions being a depth dimension that is normal to a viewing plane, two of the three dimensions each being normal to the depth dimension;
flattening the 3D mesh by assigning a single value of the depth dimension to each of the 3D vertices in the 3D mesh;
texturing the flattened 3D mesh by mapping a 2D image to at least some of the 3D vertices each represented in the three dimensions and each assigned the single value of the depth dimension that is normal to the viewing plane;
generating a first 2D frame of an animation by rendering the flattened and textured 3D mesh to which the 2D image is mapped;
modifying the flattened and textured 3D mesh by repositioning a 3D vertex among the 3D vertices while maintaining the single value of the depth dimension assigned to each of the 3D vertices, the modifying of the flattened and textured 3D mesh distorting the 2D image that is mapped to at least some of the 3D vertices of the flattened and textured 3D mesh, the modifying being performed by the one or more processors of the machine; and
generating a second 2D frame of the animation by rendering the flattened, textured, and modified 3D mesh to which the distorted 2D image is mapped.

18. The non-transitory machine-readable storage medium of description 17, wherein:
the texturing of the flattened 3D mesh includes mapping the 2D image to a portion of the 3D vertices that includes the 3D vertex; and the repositioning of the 3D vertex distorts the 2D image mapped to the portion of the 3D vertices that includes the 3D vertex.

19. A system comprising:
an access module configured to access a 3D mesh of 3D vertices each represented in three dimensions, one of the three dimensions being a depth dimension that is normal to a viewing plane, two of the three dimensions each being normal to the depth dimension;
a flattener module configured to flatten the 3D mesh by assigning a single value of the depth dimension to each of the 3D vertices in the 3D mesh;
a texture module configured to texture the flattened 3D mesh by mapping a 2D image to at least some of the 3D vertices each represented in the three dimensions and each assigned the single value of the depth dimension that is normal to the viewing plane;
a render module configured to render a first 2D frame of an animation by rendering the flattened and textured 3D mesh to which the 2D image is mapped; and
a processor configured by a motion module that configures the processor to modify the flattened and textured 3D mesh by repositioning a 3D vertex among the 3D vertices while maintaining the single value of the depth dimension assigned to each of the 3D vertices, the modifying of the flattened and textured 3D mesh distorting the 2D image that is mapped to at least some of the 3D vertices of the flattened and textured 3D mesh;
the render module being configured to generate a second 2D frame of the animation by rendering the flattened, textured, and modified 3D mesh to which the distorted 2D image is mapped.

20. The system of description 19, wherein:
the texture module is configured to texture the flattened 3D mesh by mapping the 2D image to a portion of the 3D vertices that includes the 3D vertex; and
the motion module configures the processor to distort the 2D image mapped to the portion of the 3D vertices that includes the 3D vertex by repositioning the 3D vertex.

What is claimed is:

1. A method comprising:
by operation of an access module that includes a processor of a machine, accessing a three-dimensional (3D) portion of a 3D model defined by 3D vertices that are each defined in three dimensions among which is a depth dimension ortho oval to two non-depth dimensions, the 3D portion being defined by a subset of the 3D vertices of the 3D model;
by operation of a flattener module that includes a processor of the machine, flattening the 3D portion of the 3D model by constraining the subset of the 3D vertices of the 3D model to one value of the depth dimension, the value of the depth dimension being an identifier of the flattened 3D portion and distinguishing the flattened 3D portion from other flattened 3D portions of the 3D model;
by operation of a render module that includes a processor of the machine, rendering a first animation frame based on a two-dimensional (2D) image that is mapped to the flattened 3D portion identified by the value of the depth dimension;
by operation of a motion module that includes a processor of the machine, modifying a 3D vertex in the subset of the 3D vertices based on a 3D movement vector of which a depth component in the depth dimension is ignored to constrain the 3D vertex to the value of the depth dimension; and
by operation of the render module, rendering a second animation frame based on the modified 3D vertex in the subset of the 3D vertices that defines the flattened 3D portion of the 3D model.

2. The method of claim 1, wherein:
the value of the depth dimension is a first value that identifies a first 3D portion of the 3D model and distinguishes the first 3D portion of the 3D model from a second 3D portion of the 3D model, the second 3D portion being identified by a second value of the depth dimension.

3. The method of claim 1, wherein:
the 3D model represents a 3D object;
the 2D image depicts a portion of the 3D object; and
the flattened 3D portion of the 3D model represents the portion of the 3D object depicted by the 2D image.

4. The method of claim 1, wherein:
the modifying of the 3D vertex distorts the flattened 3D portion of the 3D model; and
the rendering of the second animation frame is based on the distorted flattened 3D portion of the 3D model.

5. The method of claim 1 further comprising:
texture mapping the 2D image onto the flattened 3D portion of the 3D model; and
the rendering of the first animation frame renders the texture mapped 2D image that is mapped to the flattened 3D portion of the 3D model.

6. The method of claim 5, wherein:
the modifying of the 3D vertex distorts the flattened 3D portion of the 3D model and distorts the 2D image texture mapped onto the flattened 3D portion of the 3D model.

7. The method of claim 6, wherein:
the rendering of the second animation frame renders the distorted texture mapped 2D image that is mapped to the flattened 3D portion of the 3D model.

8. The method of claim 1, wherein:
the constraining of the subset of the 3D vertices of the 3D model to the value of the depth dimension includes assigning the value of the depth dimension to each 3D vertex in the subset of 3D vertices.

9. The method of claim 8, wherein:
the modifying of the 3D vertex includes repositioning the 3D vertex while maintaining the value of the depth dimension assigned to each 3D vertex in the subset of 3D vertices.

10. The method of claim 1, further comprising:
generating an animation that includes the first animation frame and the second animation frame in order as sequential frames in the animation.

11. The method of claim 1, further comprising:
causing presentation of an animation that includes the first animation frame and the second animation frame in order as sequential frames in the animation.

12. The method of claim 1, wherein:
the modifying of the 3D vertex includes moving the 3D vertex in a direction orthogonal to the depth dimension while constraining the 3D vertex to the value of the depth dimension.

13. The method of claim 1, wherein:
the rendering of the first animation frame is performed by graphics acceleration hardware included in the render module.

14. The method of claim 13, wherein:
the rendering of the second animation frame is performed by the graphics acceleration hardware included in the render module.

15. A non-transitory machine-readable storage medium comprising instructions that, when executed by processors of a machine, cause the machine to perform operations comprising:

by operation of an access module that includes one or more of the processors of the machine, accessing a three-dimensional (3D) portion of a 3D model defined by 3D vertices that are each defined in three dimensions among which is a depth dimension orthogonal to two non-depth dimensions, the 3D portion being defined by a subset of the 3D vertices of the 3D model;

by operation of a flattener module that includes one or more processors of the machine, flattening the 3D portion of the 3D model by constraining the subset of the 3D vertices of the 3D model to one value of the depth dimension, the value of the depth dimension being an identifier of the flattened 3D portion and distinguishing the flattened 3D portion from other flattened 3D portions of the 3D model;

by operation of a render module that includes one or more processors of the machine, rendering a first animation frame based on a two-dimensional (2D) image that is mapped to the flattened 3D portion identified by the value of the depth dimension;

by operation of a motion module that includes one or more processors of the machine, modifying a 3D vertex in the subset of the 3D vertices based on a 3D movement vector of which a depth component in the depth dimension is ignored to constrain the 3D vertex to the value of the depth dimension; and by operation of the render module that includes one or more processors of the machine, rendering a second animation frame based on the modified 3D vertex in the subset of the 3D vertices that defines the flattened 3D portion of the 3D model.

16. The non-transitory machine-readable storage medium of claim 15, wherein:

the value of the depth dimension is a first value that identifies a first 3D portion of the 3D model and distinguishes the first 3D portion of the 3D model from a second 3D portion of the 3D model, the second 3D portion being identified by a second value of the depth dimension.

17. The non-transitory machine-readable storage medium of claim 15, wherein:

the constraining of the subset of the 3D vertices of the 3D model to the value of the depth dimension includes assigning the value of the depth dimension to each 3D vertex in the subset of 3D vertices; and the modifying of the 3D vertex includes repositioning the 3D vertex while maintaining the value of the depth dimension assigned to each 3D vertex in the subset of 3D vertices.

18. A system comprising:

an access module including a processor of a machine and configured to access a three-dimensional (3D) portion of a 3D model defined by 3D vertices that are each defined in three dimensions among which is a depth dimension orthogonal to two non-depth dimensions, the 3D portion being defined by a subset of the 3D vertices of the 3D model;

a flattener module including a processor of the machine and configured to flatten the 3D portion of the 3D model by constraining the subset of the 3D vertices of the 3D model to one value of the depth dimension, the value of the depth dimension being an identifier of the flattened 3D portion and distinguishing the flattened 3D portion from other flattened 3D portions of the 3D model;

a render module including a processor of the machine and configured to render a first animation frame based on a two-dimensional (2D) image that is mapped to the flattened 3D portion identified by the value of the depth dimension; and a motion module including a processor of the machine and configured to modify a 3D vertex in the subset of the 3D vertices based on a 3D movement vector of which a depth component in the depth dimension is ignored to constrain the 3D vertex to the value of the depth dimension;

the render module being configured to render a second animation frame based on the modified 3D vertex in the subset of the 3D vertices that defines the flattened 3D portion of the 3D model.

19. The system of claim 18, wherein:

the value of the depth dimension is a first value that identifies a first 3D portion of the 3D model and distinguishes the first 3D portion of the 3D model from a second 3D portion of the 3D model, the second 3D portion being identified by a second value of the depth dimension.

20. The system of claim 18, wherein:

the flattener module is configured to constrain the subset of the 3D vertices of the 3D model to the value of the depth dimension by assigning the value of the depth dimension to each 3D vertex in the subset of 3D vertices; and the motion module is configured to modify the 3D vertex by repositioning the 3D vertex while maintaining the value of the depth dimension assigned to each 3D vertex in the subset of 3D vertices.

* * * * *

UNITED STATES PATENT AND TRADEMARK OFFICE
CERTIFICATE OF CORRECTION

PATENT NO. : 9,652,880 B2  
APPLICATION NO. : 14/622595  
DATED : May 16, 2017  
INVENTOR(S) : Hobbs et al.

Page 1 of 1

It is certified that error appears in the above-identified patent and that said Letters Patent is hereby corrected as shown below:

In the Specification

In Column 12, Line 5, delete "190)" and insert --590)-- therefor

In Column 14, Line 60, after "mesh;", insert --¶--

In the Claims

In Column 17, Line 46, in Claim 1, delete "ortho oval" and insert --orthogonal-- therefor In Column 18, Line 22, in Claim 5, after "claim 1", insert --,--

Signed and Sealed this
Twenty-second Day of May, 2018

Andrei Iancu
*Director of the United States Patent and Trademark Office*